United States Patent [19]
Estakhri et al.

[11] Patent Number: 5,606,660
[45] Date of Patent: Feb. 25, 1997

[54] METHOD AND APPARATUS FOR COMBINING CONTROLLER FIRMWARE STORAGE AND CONTROLLER LOGIC IN A MASS STORAGE SYSTEM

[75] Inventors: Petro Estakhri, Pleasanton; Robert Reid, Fremont; Berhanu Iman, Sunnyvale, all of Calif.

[73] Assignee: Lexar Microsystems, Inc., Fremont, Calif.

[21] Appl. No.: 326,884

[22] Filed: Oct. 21, 1994

[51] Int. Cl.$^6$ .................................................. G06F 11/30
[52] U.S. Cl. .................................................. 395/183.14
[58] Field of Search ..................... 395/183.01, 184.01, 395/185.01, 183.14, 700

[56] References Cited

U.S. PATENT DOCUMENTS

| | | | |
|---|---|---|---|
| 4,392,208 | 7/1983 | Burrows et al. | 364/900 |
| 4,439,837 | 3/1984 | Aiena et al. | 395/700 |
| 4,462,086 | 7/1984 | Kurakake | 364/900 |
| 4,849,927 | 7/1989 | Vos | 364/900 |
| 5,003,591 | 3/1991 | Kauffman et al. | 380/10 |
| 5,058,074 | 10/1991 | Sakamoto | 365/228 |
| 5,148,516 | 9/1992 | Hassoun | 395/100 |
| 5,268,928 | 12/1993 | Herb et al. | 364/134 |

*Primary Examiner*—Hoa T. Nguyen
*Attorney, Agent, or Firm*—Maryam Imam; Steven A. Shaw

[57] ABSTRACT

A microprocessor-controlled solid state storage system having a controller and non-volatile memory for storing firmware code therein. The controller includes first memory for storing firmware code transferred from the non-volatile memory, and second memory including primitive firmware code stored therein causing execution of a microprocessor for transferring the firmware code from reserved blocks in the non-volatile memory into the first memory upon initialization of the storage system and causing calculation of a checksum for verification of the integrity of the firmware code.

19 Claims, 9 Drawing Sheets

METHOD AND APPARATUS FOR COMBINING CONTROLLER FIRMWARE STORAGE AND CONTROLLER LOGIC IN A MASS STORAGE SYSTEM

FIELD OF THE INVENTION

This invention relates generally to solid state storage systems, particularly to microprocessor controlled solid state storage system employing firmware therewith.

BACKGROUND OF THE INVENTION/PRIOR ART

In storage media applications, traditionally a microprocessor (uP) is employed to control the operations of a controller as depicted in prior art FIGS. 1–3. In such applications, the microprocessor executes routine processes and algorithms (sometimes referred to as program code or firmware code) stored in its program memory being of variable storage capacity limited substantially by cost and space. One approach traditionally utilized to address this problem is to store program code in ROM (read-only memory) or EPROM memory external to the uP as in FIG. 1. External memory facilitates the frequent changes of firmware due to product enhancements, bug fixes, and customer's special requirements. Due to the costliness of memory chips and board space, the disadvantage of this is the memory's component cost and board space requirements.

To address the above problems, several approaches have been adopted in the past. The uP can contain the firmware in its internal ROM as shown in FIG. 2. While this approach resolves board space restrictions, flexibility of firmware is lost in that different code or versions thereof can not be loaded in the ROM. Furthermore firmware problems or bugs can not be resolved without replacing the ROM.

Yet another approach employed as shown in FIG. 3 particularly employed in mass storage applications is to execute firmware from a RAM (Random Access Memory) after moving the firmware code from reserved blocks on a disk. Typically, the microprocessor contains an internal ROM from which code is executed to move the firmware to a RAM. Where this approach retains code flexibility, the cost and space restrictions apply at best to a lesser extent.

In a prior art solid state storage system employing external reserved blocks of non-volatile or flash memory and on-chip microprocessors, firmware is initially stored in flash memory and subsequently downloaded to off-chip RAM. During normal operation, the microprocessor executes code from the off-chip RAM. While this approach maintains code flexibility, it is again costly and consumes space on the board.

Therefore, microprocessor-controlled solid state storage systems present the problem of utilizing readily modifiable firmware while requiring efficient use of silicon as well as board space in order to, among other reasons, reduce production costs. The present invention solves this problem as described below.

BRIEF SUMMARY OF THE INVENTION

It is an object of this invention in a solid state storage system having a semiconductor chip and a microprocessor for executing firmware code, to transfer said microprocessor firmware from non-volatile memory residing externally to said semiconductor chip to first memory contained within said chip upon initialization.

Another object of the invention is to employ a second memory contained within the semiconductor chip for storing a plurality of firmware codes wherein the second memory is for transferring the firmware from the first memory to the second memory and for checking the integrity of the microprocessor firmware.

A still further object is to calculate a check sum for checking the integrity or the existence of the microprocessor firmware.

Yet another object of the invention is to utilize a RAM for the first memory and a ROM for the second memory.

Still another object of the invention is to cause plurality of transfers of firmware from said non-volatile memory to said first memory upon invalid first transfer of the same.

Still another object of the invention is to cause at least one of the firmware stored in the ROM contained within the semiconductor chip to receive a special command upon detection of the microprocessor firmware being invalid at least once.

Still another object of the invention is to cause the transfer of microprocessor firmware from the interface to non-volatile memory during manufacturing of said solid state storage system.

Yet another object of the invention is to store the microprocessor firmware in reserved blocks contained within the non-volative memory.

Still another object of the invention is to allow uploading of different firmware upon system upgrades or debugging.

BRIEF DESCRIPTIONS OF THE DRAWINGS

DETAILED DESCRIPTION OF THE PREFERRED EMBODIMENT

The present invention includes a method and apparatus for storing microprocessor firmware code while preserving code flexibility and eliminating cost and space issues in microprocessor-controlled solid state storage devices. The theory of operation of this invention is as follows:

FIGS. 6–10 show block diagrams of the preferred embodiment by depicting generally the essential elements employed by the invention particularly highlighting the elements actually in operation during various steps of the invention.

Figure 6:
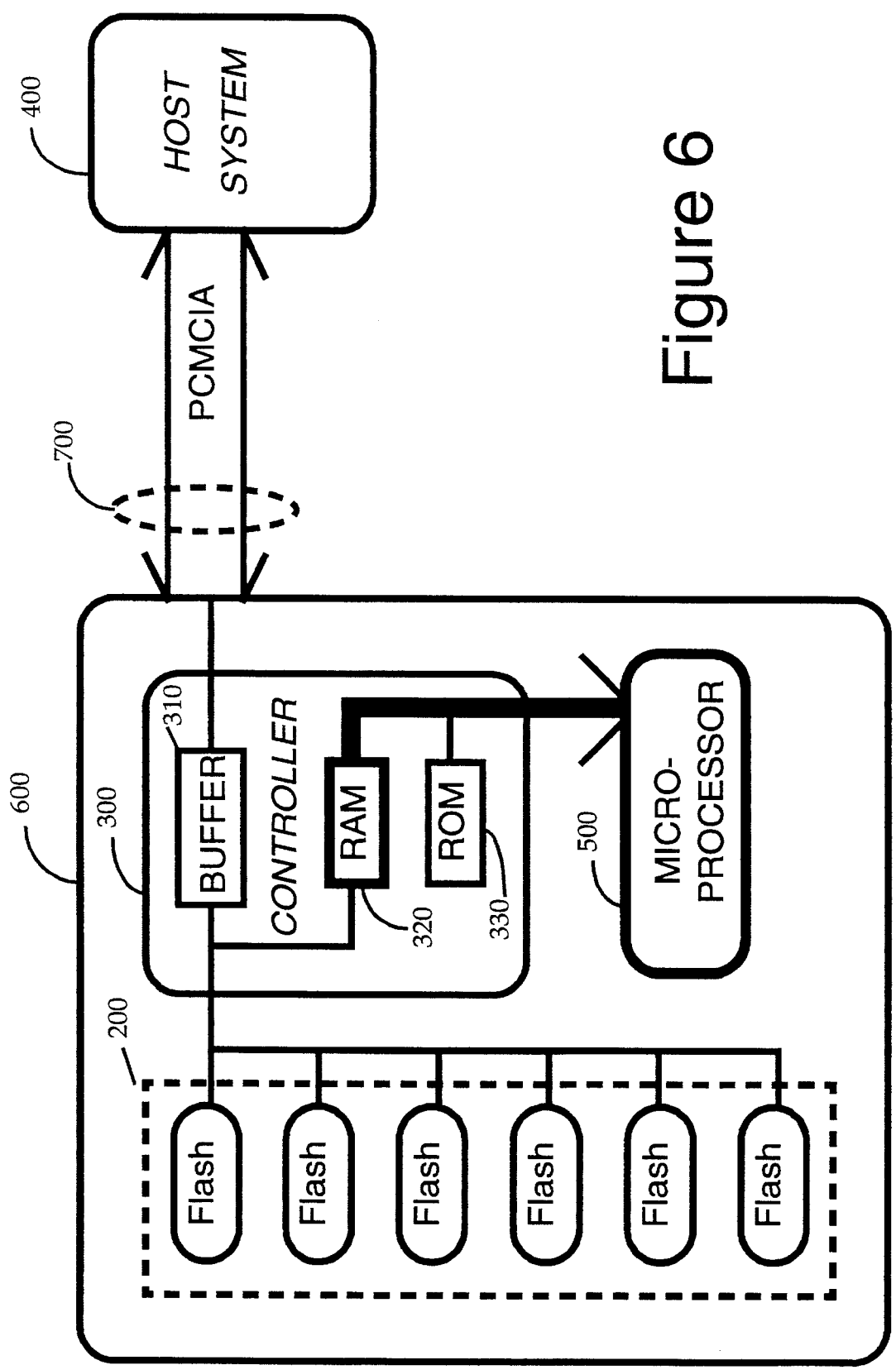
FIG. 6 is a block diagram of a preferred embodiment highlighting the functions utilized during normal operation.

FIG. 6 shows a block diagram of a preferred embodiment of the present invention. Printed circuit board (PCB) 600 is populated with flash memory sectors 200, a controller semiconductor device 300 and a microprocessor 500. Flash memory sectors 200 are coupled to a controller semiconductor chip 300. Microprocessor 500 is coupled to controller 300. Microprocessor 500 can be any commercially available microprocessor such as an Intel 8088 or Motorola 68HC11.

Controller 300 includes a buffer 310 through which data or firmware code is transferred bidirectionally between flash memory 200 and host system 400 through a PCMCIA interface 700. Firmware code and multiple copies thereof are stored in preselected blocks in flash memory 200. In the preferred embodiment shown in FIGS. 5–9, two copies of firmware code are stored in different places of flash memory 200. Controller 300 additionally comprises memory storage RAM 320 and ROM 330 both having outputs wherein said outputs are coupled to microprocessor 500. RAM 320 having input coupled to flash sectors 200 stores firmware executed by microprocessor 500. ROM 330 also contains primitive microprocessor code for downloading firmware from flash sectors 200 to RAM 320 in addition to code for checking the integrity of the downloaded code. ROM 330 further can be employed to store special routines randomly and selectively executed by microprocessor 500. It should be noted that the present invention can be implemented utilizing other storage means while maintaining the spirit of the invention. The use of ROM 330 results in less costly and smaller space requirements thereby reducing the manufacturing costs associated with controller 300.

Host 400 communicates with controller 300 through PCMCIA interface 700 for exchanging command as well as data and program code information. While this type of interface is commonly employed in industry, other types of interfaces can provide the transfer means employed in the invention.

Figure 1:
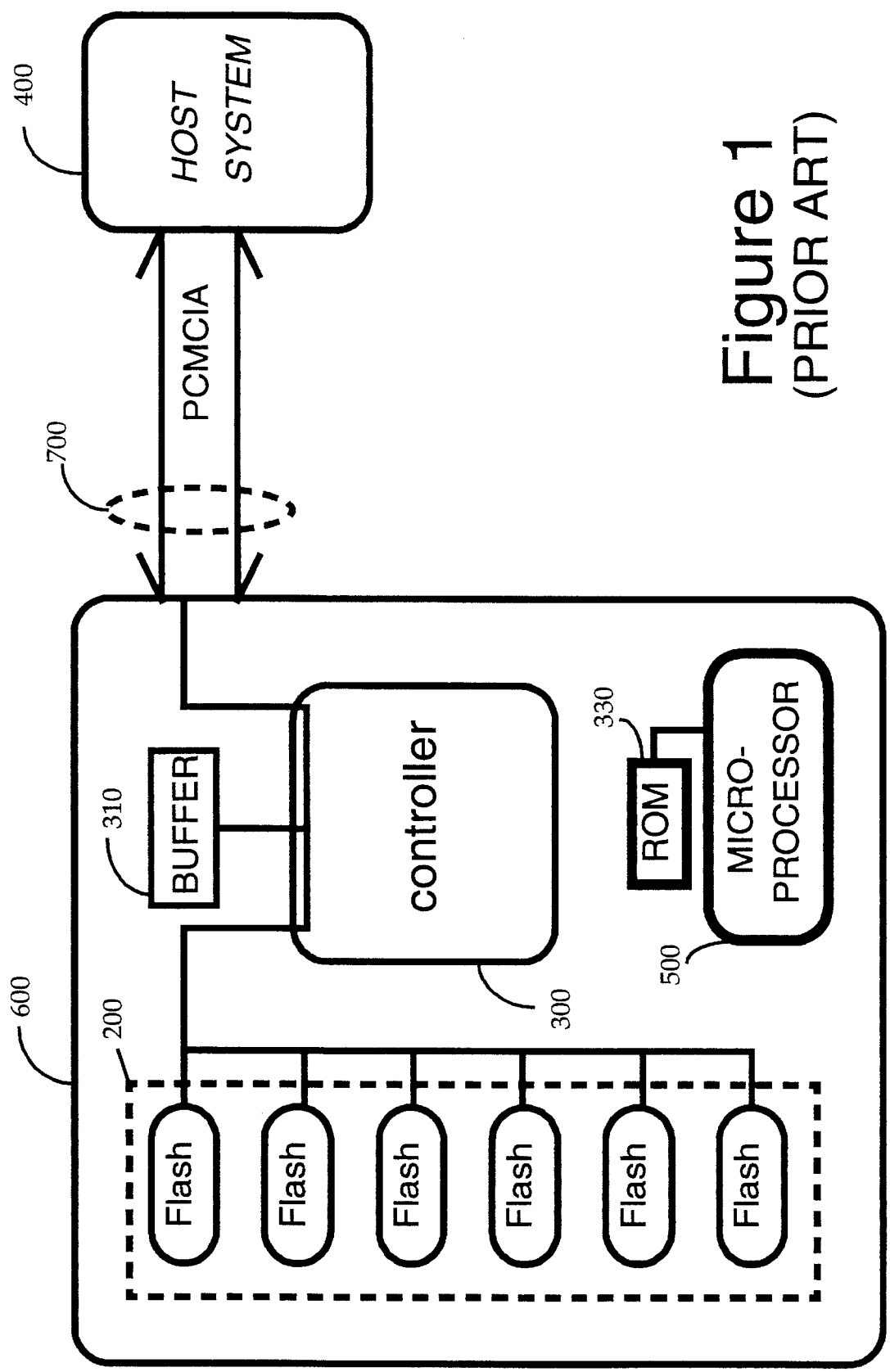
FIG. 1 shows a block diagram of a prior art solid state storage system employing a ROM-based microprocessor.
Figure 2:
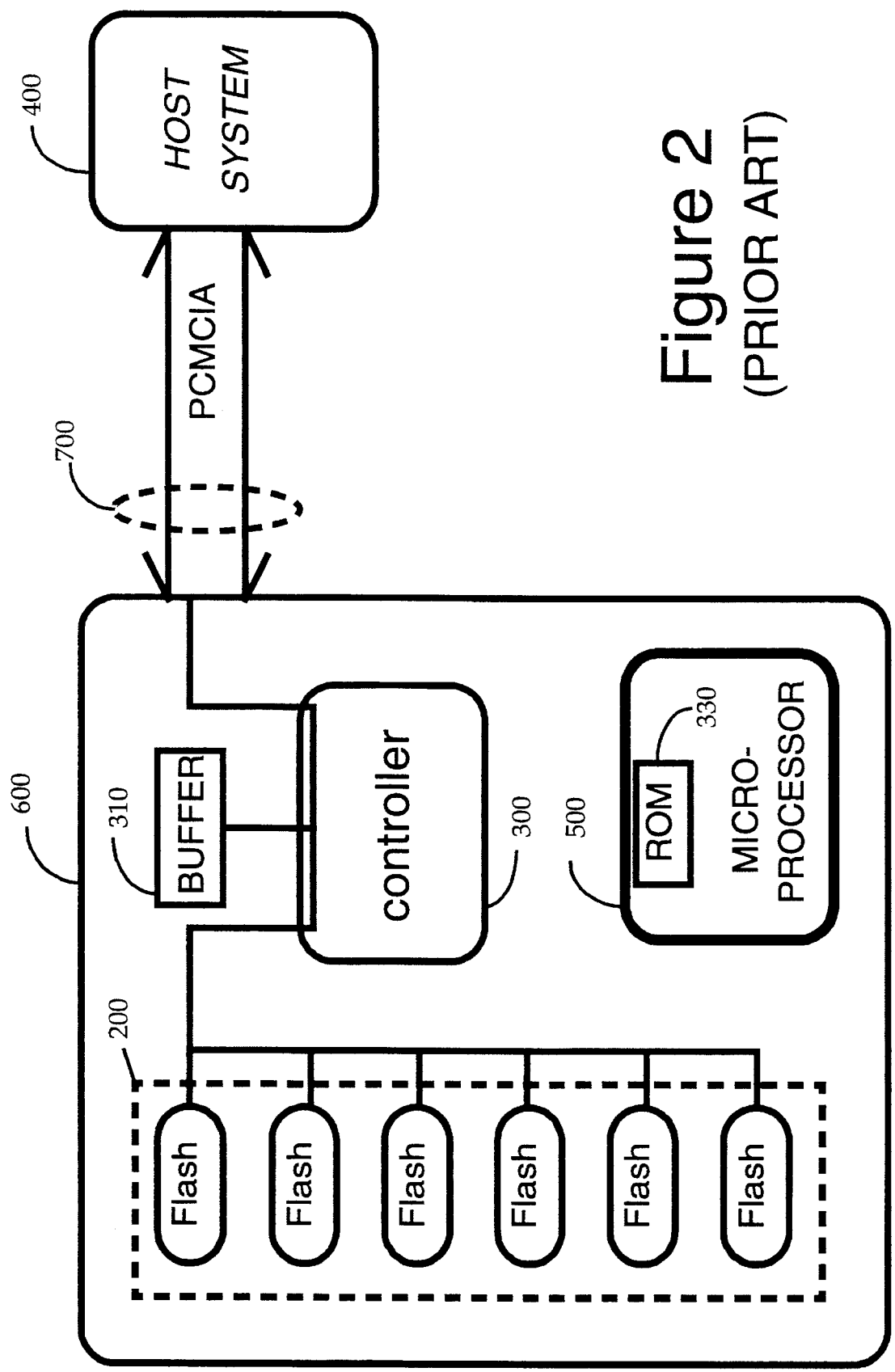
FIG. 2 is a block diagram of a prior art solid state storage system where the ROM resides in the same Integrated Circuit (IC) as the microprocessor.
Figure 3:
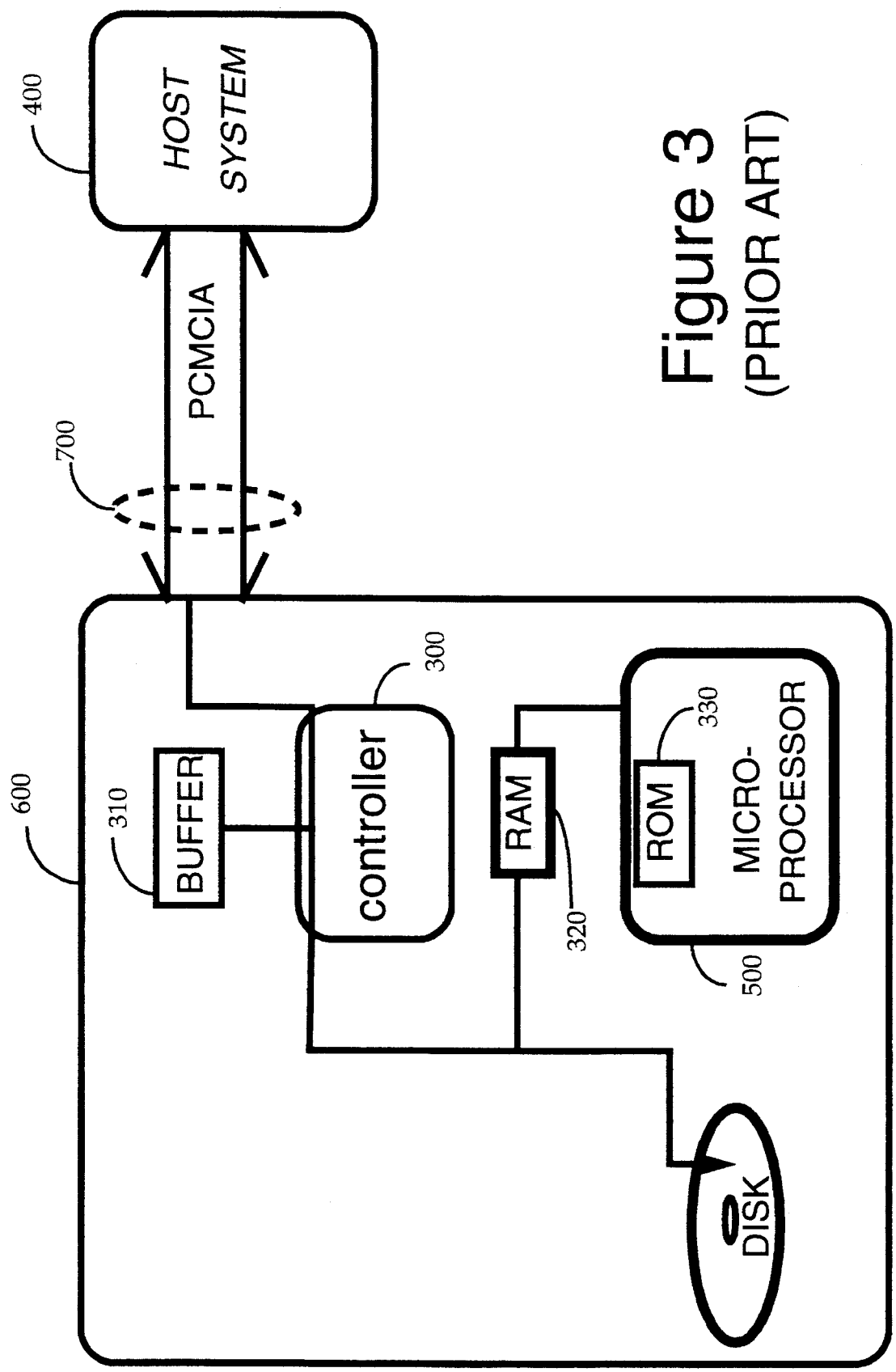
FIG. 3 is a block diagram of a prior art mass storage system employing RAM and ROM for storing microprocessor firmware.
Figure 4:
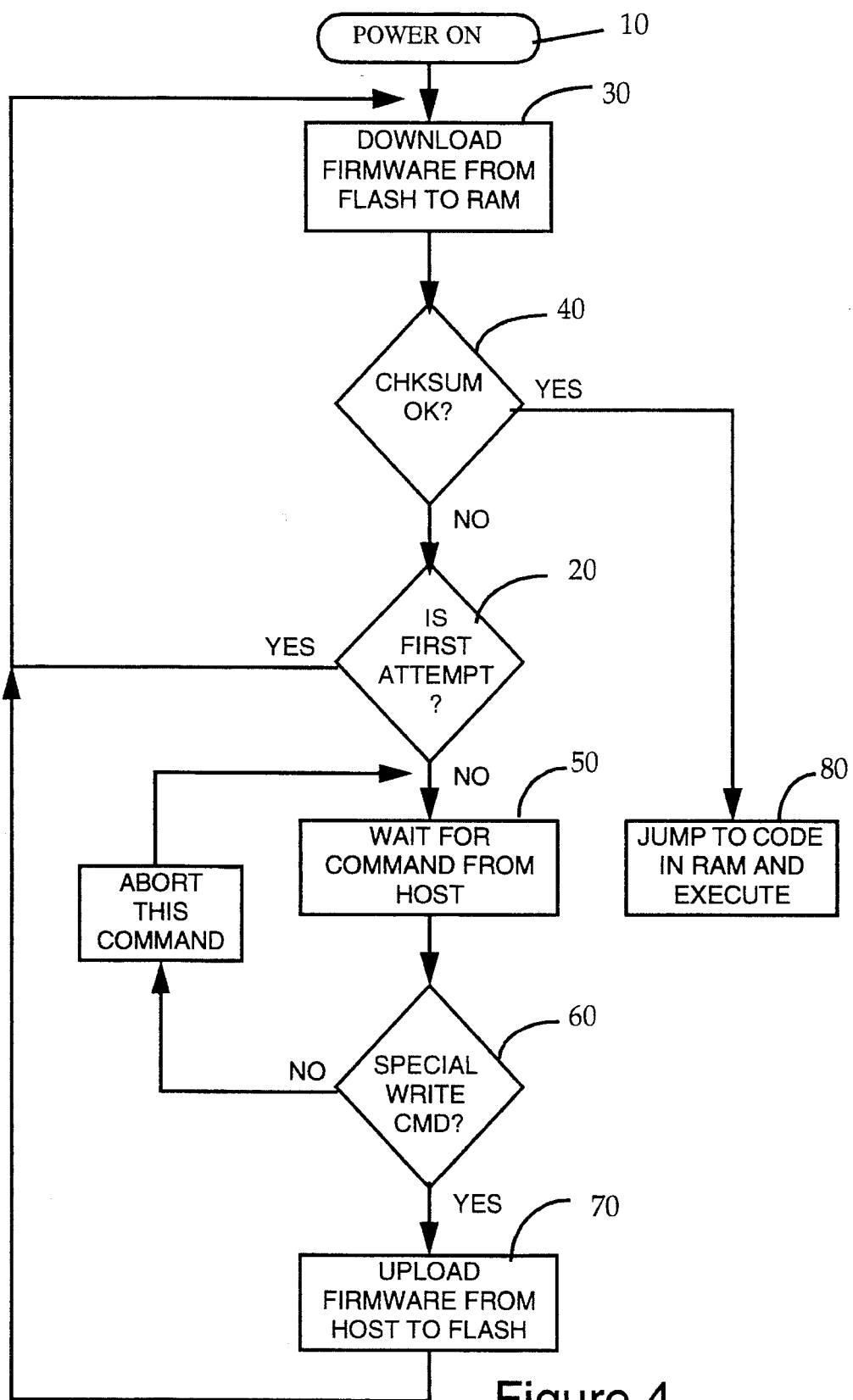
FIG. 4 shows a preferred embodiment of the present invention where the flow of firmware is shown through the solid state storage system.
Figure 5:
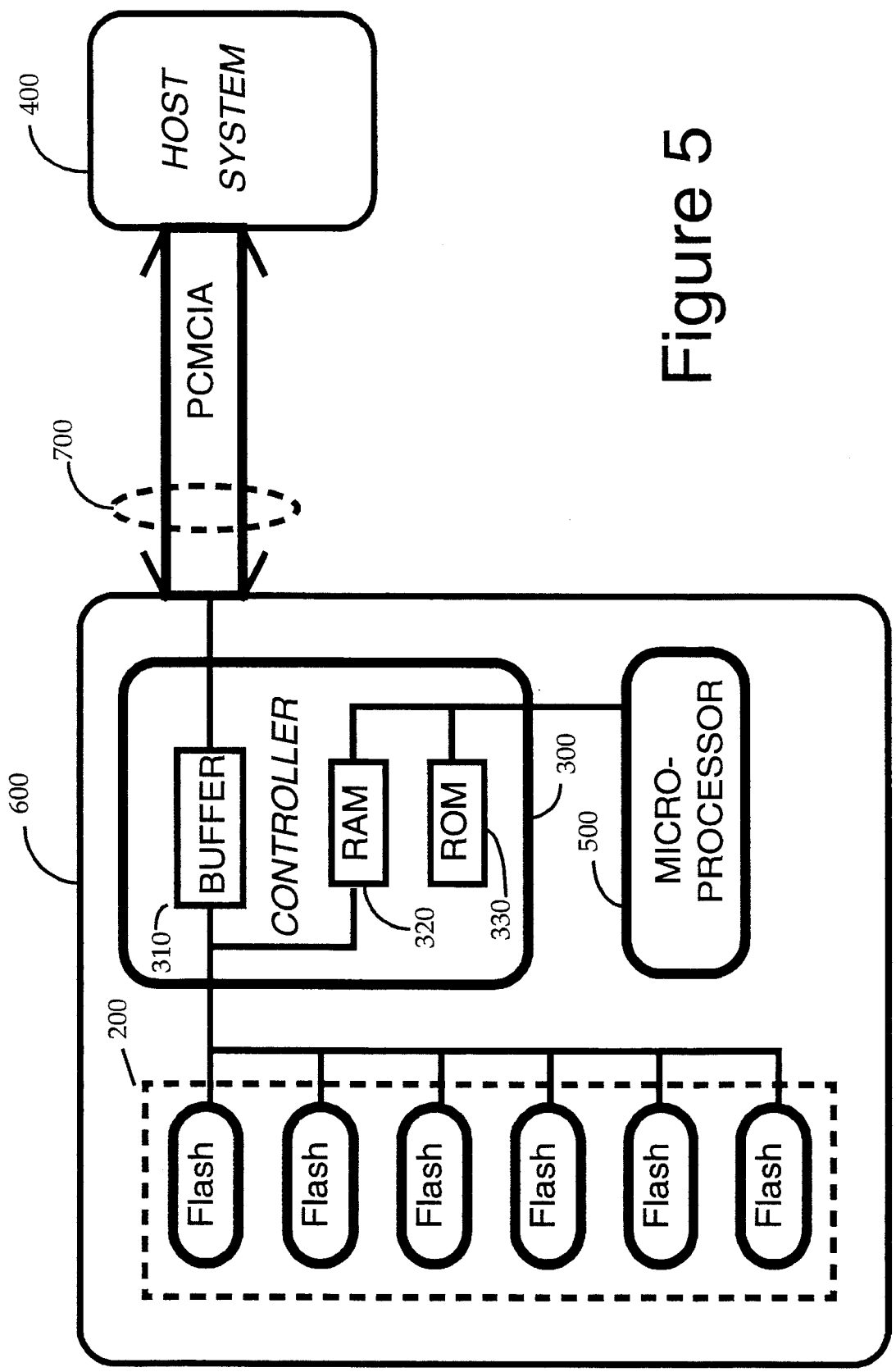
FIG. 5 shows a preferred embodiment block diagram of the present invention.

FIG. 4 shows a flow chart of the firmware transfer operation of the invention. Although various other means can be utilized to accomplish the same, system initialization in the preferred embodiment is caused by the application of a power-on signal 10 or a reset signal. Upon initialization microprocessor 500 executes firmware (commonly referred to as firmware code or program code) from ROM 330. The code stored in ROM 330 is a primitive code and small in size due to its narrowly-defined application. Among other times, system initialization occurs during manufacturing of said system. Upon the occurrence of initialization, microprocessor 500 executing code from ROM 330 downloads what it thinks is valid firmware code from predetermined reserved blocks of flash memory 200 located externally to controller 300 to the internal RAM 320 of the controller. However, during manufacturing and before host 400 has had an opportunity to upload valid firmware code to flash memory 200, the former download process will clearly be ineffective in that it will result in invalid code residing in RAM 320.

After download, integrity of the firmware stored in RAM 320 is tested. Although various known methods in the art can be utilized for verification of the firmware without departing from the spirit of the invention, the preferred embodiment calculates a checksum wherein binary values representing said code are added and compared to a predetermined value. If the predetermined checksum is equal to the calculated checksum, the downloaded firmware code will be considered valid. During manufacturing or initial testing the result of the first occurrence of the above firmware validity exercise will always be a failure due to the lack of existence of valid code in flash memory 200. The above integrity check is therefore performed to verify the accuracy as well as the existence of firmware in flash memory 200. Where the code is determined to be valid and/or accurate, program flow is transferred to RAM 320 where microprocessor 500 starts executing code from RAM 320 until the next occurrence of initialization.

In the event the firmware verification exercise performed during manufacturing and testing or otherwise, is unsuccessful, multiple repetitions of downloads are performed. Each download, however, retrieves code from an alternate starting location in flash memory 200. The preferred embodiment downloads twice in this manner. It should be obvious to one of ordinary skill in the art that repetitions of download can be a programmable plurality of times. However, it is an important part of the invention to increase the overall error tolerance of the solid state storage system by downloading the same firmware code from different locations of flash memory 200.

Upon consecutive failures of download repetitions, microprocessor 500 while executing code from ROM 330 waits for a special command from host 400. Meanwhile, microprocessor 500 reports code failure status by aborting any other command besides the special command, initiated by the host. Commands sent by host 400, other than special commands, include vendor unique commands such as diagnostics. Because at least one command is always initiated by host 400 prior to the occurrence of the special command, status of code failure is guaranteed to be reported. Although any unique command can be utilized as the special command, the preferred embodiment as shown in FIG. 4 uses a special write command. Upon receiving said special command, firmware is uploaded from host 400 to flash memory sectors 200.

As earlier stated, the preferred embodiment as depicted by FIGS. 5 through 9 will download RAM 320 code and check the integrity of the same twice before requiring a code upload from host 400 to flash sectors 200. While the number of times download and checksum validity operations are performed can be flexible, in certain circumstances it may be advantageously faster to repeat the steps of 30, 40, 50 and 60 in FIG. 4 fewer times.

FIG. 6 is a block diagram of the preferred embodiment highlighting RAM 320 and microprocessor 500 to show microprocessor 500's normal firmware execution path. During normal operation of the system such as after successful downloading of code from flash 200 to RAM 320, microprocessor 500 accesses firmware from RAM 320 every instruction cycle to execute various routines, algorithms and processes. The selection of firmware execution by microprocessor 500 from ROM 330 and RAM 320 is achieved by identifying the RAM and ROM firmware codes from different areas of an overall firmware and data memory map.

Figure 7:
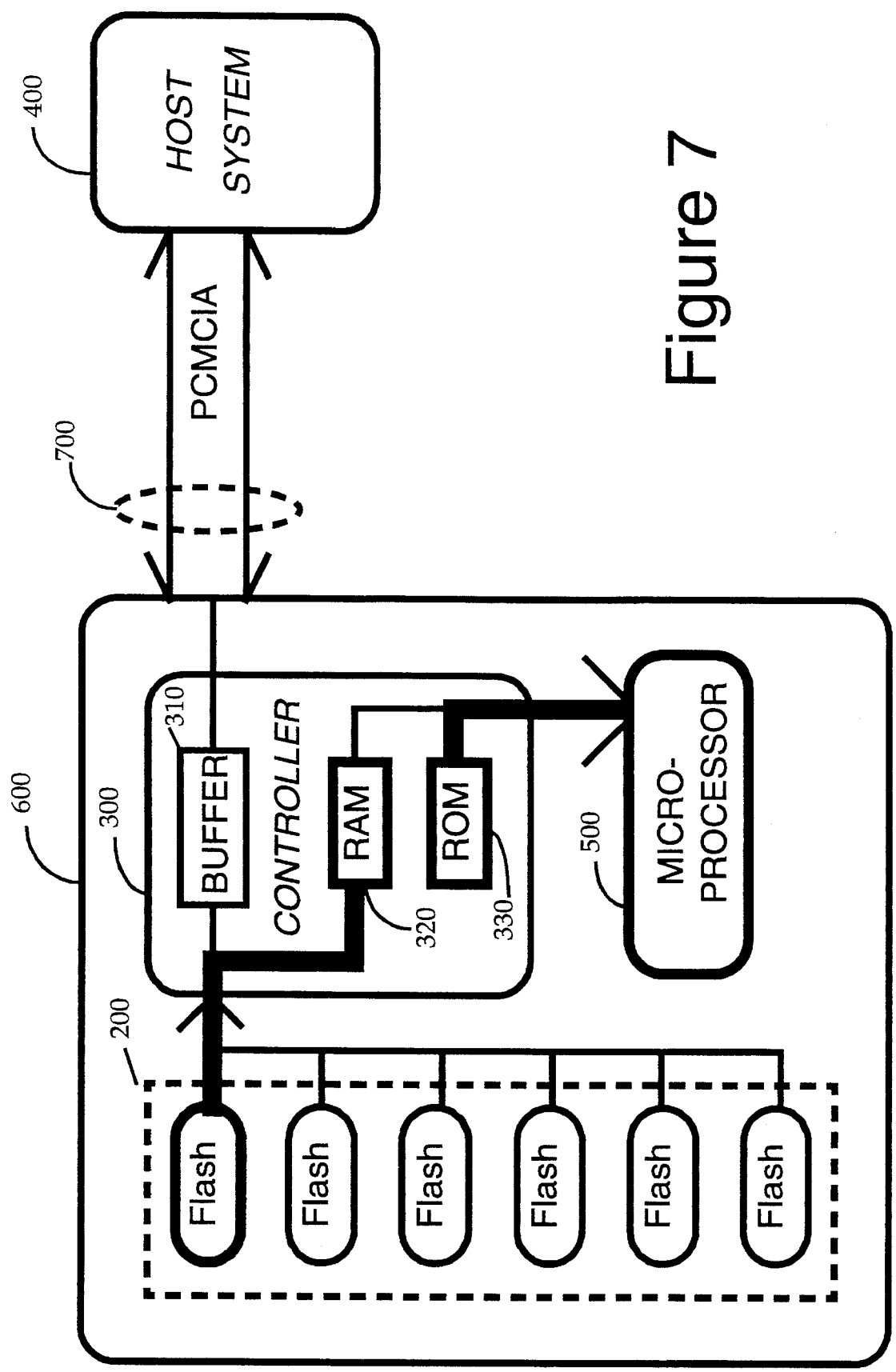
FIG. 7 is a block diagram of a preferred embodiment highlighting the functions utilized during download of firmware from non-volatile memory to RAM on a controller chip during initialization.

FIG. 7 shows microprocessor 500's firmware execution path during downloading of firmware from flash memory 200 to RAM 320 upon system initialization during which system preparation and configuration takes place in response to a power-on signal or other initialization means. Primitive code residing in ROM 330 is executed by microprocessor 500 wherein the contents of flash sector 200 are transferred to RAM 320.

Figure 8:
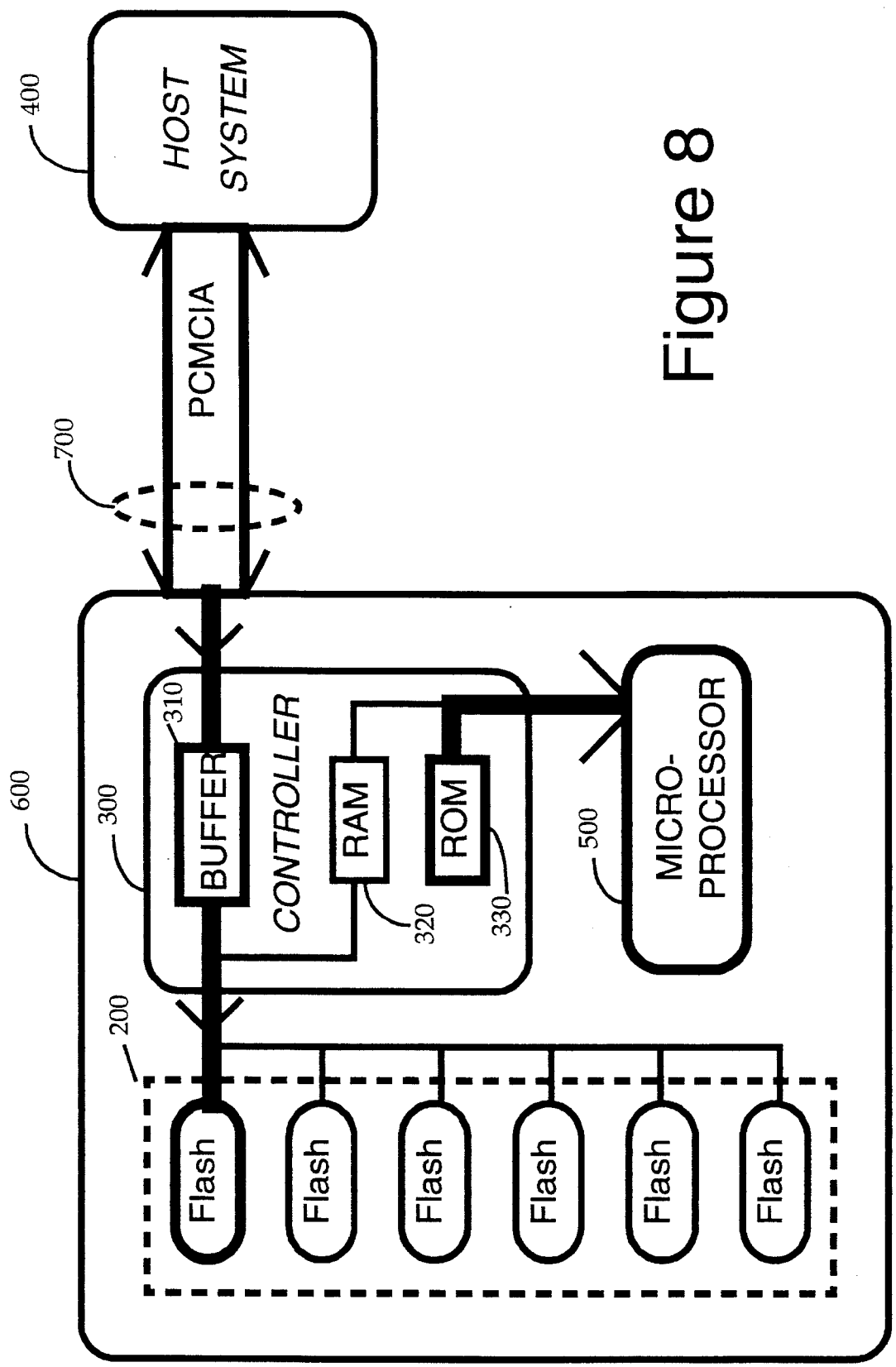
FIG. 8 is a block diagram of a preferred embodiment highlighting the functions employed during upload of firmware from the host to the non-volatile memory during manufacturing.

FIG. 8 shows microprocessor 500's firmware execution path during code upload from host 400 to flash memory 200. During manufacturing, microprocessor 500 while executing primitive code from ROM 330 should detect invalid checksum code in RAM 320 as shown in steps 40, 50, and 60 of FIG. 4. Consequently, firmware for causing normal operation of microprocessor 500 is uploaded from host 400 (or other test equipment not shown in the preferred embodiment) to circuit board 600 through interface 700. Before the occurrence of said upload, circuit board 600 is not programmed. In circuit board 600, firmware is transferred to flash memory 200 through buffer 310, the latter residing on chip 300.

Figure 9:
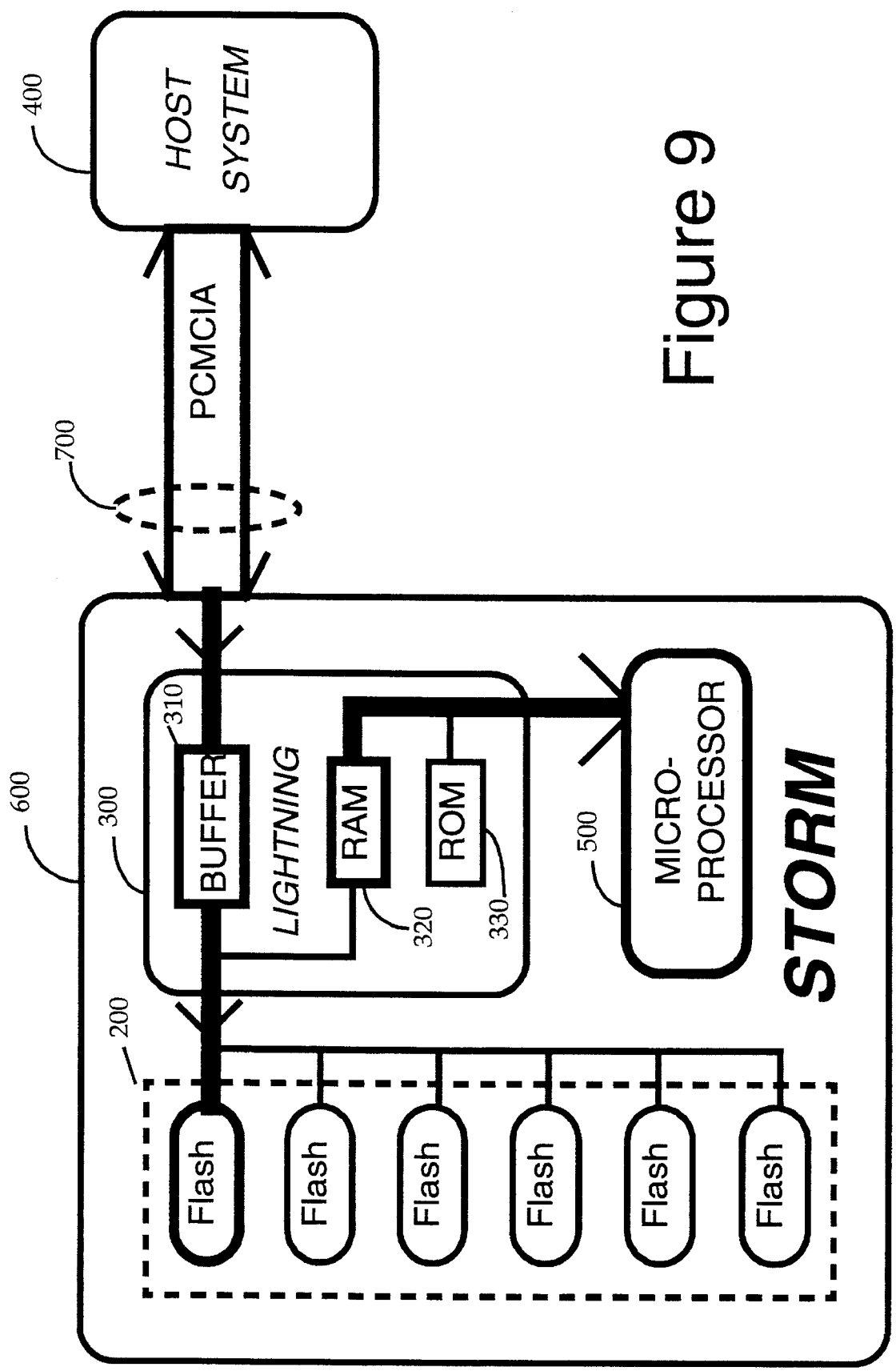
FIG. 9 is a block diagram of a preferred embodiment highlighting the functions employed during upload of firmware from the host to the non-volatile memory during testing or field operation.

FIG. 9 shows microprocessor 500's firmware execution path during code uploading after manufacturing and generally at the field site or repair depot where new or modified firmware is necessary. Upon detection of a special command, new or updated code is uploaded into flash memory 200, meanwhile microprocessor 500 continues to execute the old code in RAM 320 until the occurrence of power-on. Pursuant to the latter occurrence, microprocessor 500's execution flow resumes as depicted by FIG. 4.

While a preferred embodiment of the present invention has been disclosed and described in detail herein, it will be obvious to those skilled in the art that various changes in form and detail may be made therein without departing from the spirit and scope thereof.

We claim:

1. A method for transferring firmware code for execution in a microprocessor controlled solid state storage device including a non-volatile memory storing executable firmware code, a microprocessor, an interface and a controller-semiconductor-chip for controlling access to the non-volatile memory by an external host computer, the controller-semiconductor-chip having first memory for storing the firmware code to be transferred and executed by the microprocessor and second memory for storing primitive code for downloading the firmware code from the non-volatile memory to the first memory, and for checking integrity of the transferred firmware code, said method comprising the steps of:

(a) transferring the firmware code from first storage locations in the non-volatile memory to the first memory while the microprocessor executes the primitive firmware code from said second memory;

(b) verifying the validity of the transferred firmware code, and upon successful verification thereof, causing the microprocessor to execute the transferred firmware code;

(c) and if verification of the transferred firmware code is unsuccessful, repeating steps (a) and (b) a predetermined number of times on firmware code transferred from alternate storage locations in the non-volatile memory, and upon successful verification of any of the repetitions, beginning execution of the verified firmware code;

(d) if verification of transferred firmware code during all of said repetitions of step (c) is unsuccessful, waiting to receive a special command from the host computer through the interface while executing codes from the second memory; and (e) upon reception of said special command, transferring new firmware code through the interface from the host computer to the non-volatile memory.

2. A method as recited in claim 1 wherein upon each said repeating in step (c), said transferring in step (a) starts from an alternate predetermined reserved block of the non-volatile memory.

3. A method as recited in claim 1 wherein the transferring steps in step (a) and step (e) are performed by the microprocessor.

4. A method as recited in claim 1 wherein while waiting to receive a special command, aborting all other commands received through the interface.

5. A method as recited in claim 4, wherein the transferring steps in step (a) and step (e) include selecting either an execution of the firmware code from said first memory or an execution of the primitive code from said second memory.

6. A method as recited in claim 5 wherein said selecting step is preformed by assigning different memory storage locations for said firmware codes in said first and second memories.

7. A microprocessor controlled solid state storage device comprising:

a microprocessor;

at least one non-volatile memory having reserved blocks assigned therein and storing firmware code in said assigned blocks;

a controller semiconductor chip having an interface for controlling access to the non-volatile memory from a host computer, and including a first memory receiving and storing firmware code transferred thereto from said non-volatile memory under control of said microprocessor; and a second memory including primitive firmware code for causing said microprocessor to transfer said firmware code, to be executed by said microprocessor, from said reserved blocks into said first memory during initialization of said storage device, said primitive firmware code for further causing said microprocessor to calculate a checksum for verification of the integrity of said transferred firmware code.

8. A storage device as recited in claim 7 wherein said first memory includes a RAM and said second memory includes a ROM.

9. A storage device as recited in claim 7 or 8 wherein said first and second memories are identified by first and second storage locations in a memory map defined by the host computer, said microprocessor being operative to use said first and second starting locations to execute either said primitive code or said transferred firmware code.

10. A storage device as recited in claim 7 or 8 wherein said primitive code of said second memory includes code for further causing the microprocessor to receive a predetermined command upon unsuccessful verification of said checksum.

11. A storage device as recited in claim 10 wherein said second memory further contains code to cause the transfer of an updated version of said firmware code through the interface to said reserved blocks of the non-volatile memory.

12. A storage device as recited in claims 7 or 8 wherein upon unsuccessful verification of said checksum the microprocessor accesses said firmware code in said first memory.

13. A storage device as recited in claim 7 or 8 wherein upon unsuccessful verification of said transferred firmware code, said primitive firmware code sequentially causes transfer of said firmware code from alternative reserved blocks of the non-volatile memory a predetermined number of times.

14. In a microprocessor controlled solid state storage device having a microprocessor, a non-volatile memory with copies of firmware code stored in alternate locations therein, a controller having a first and second memory and an interface for controlling access of the non-volatile memory by a host computer, a method for transferring said stored firmware code for execution by the microprocessor comprising the steps of:

(a) initializing the storage device;

(b) transferring the stored firmware code from the non-volatile memory to the first memory while executing program codes stored in the second memory;

(c) verifying the validity of the transferred firmware code, and upon successful verification of the transferred firmware code, selecting program codes from the first memory for execution;

(d) upon unsuccessful verification of the transferred firmware code, repeatedly transferring duplicate copies of firmware code from alternate storage locations in the non-volatile memory to said first memory a predetermined number of times and upon completion of each of the transfers, repeating step (c);

(e) if no transferred firmware code is successfully verified, receiving a special command through the interface from the host computer;

(f) upon reception of said special command, transferring updated firmware code from the host computer through the interface to said non-volatile memory;

(g) repeating the above steps starting with step (b).

15. A method as in claim 14 wherein said step (d) increases the overall error tolerance of the solid state storage system.

16. A method as in claim 14 wherein said verifying step includes the sub-steps of calculating a checksum and comparing the calculated checksum to a predetermined value.

17. A method as in claim 14 wherein the step of repeatedly transferring in step (d) is performed at least two times before said special command is received.

18. A method as in claim 14 wherein step (f) is performed during manufacturing of said solid state storage device.

19. A method as in claim 14 wherein a power-on signal causes said initializing.

\* \* \* \* \*